Dec. 16, 1941. J. T. ROGERS 2,266,081
MELTING POT DISCHARGE VALVE OPERATING MEANS
Filed March 23, 1940
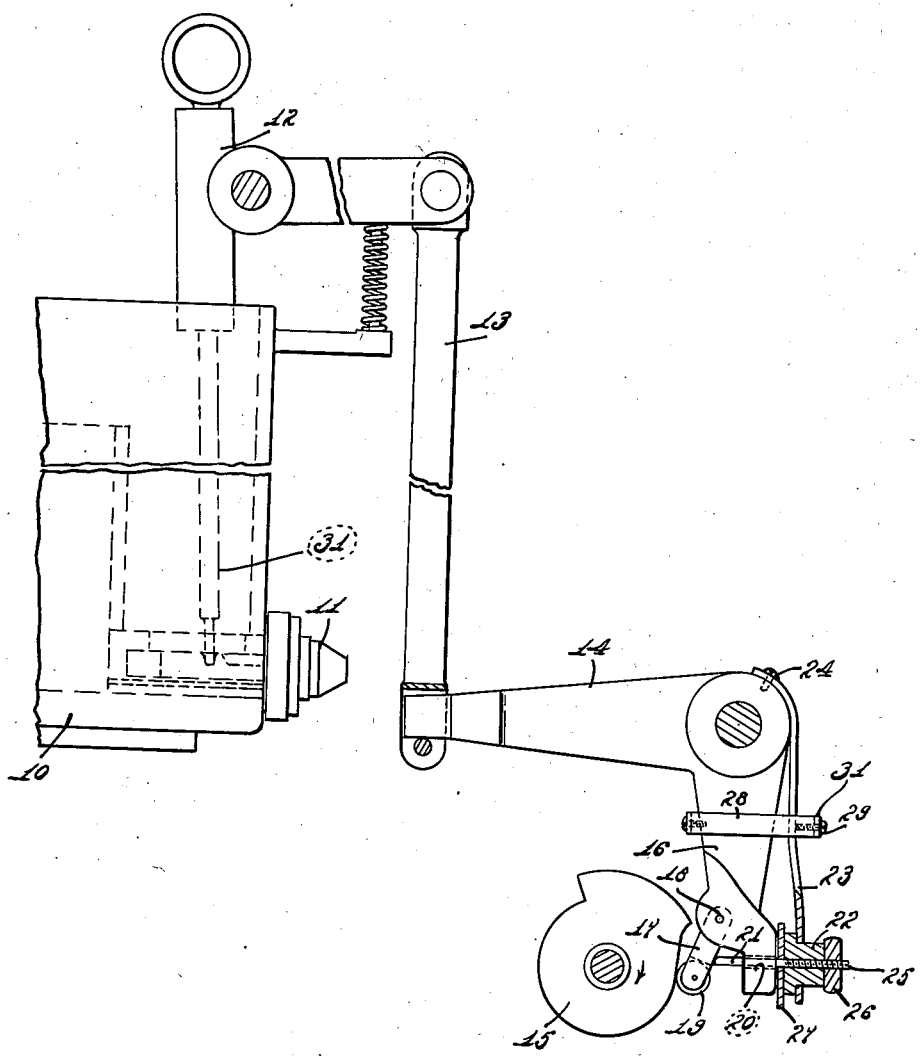
INVENTOR.
Jay T. Rogers,
BY
Hood & Hahn.
ATTORNEYS.

Patented Dec. 16, 1941

2,266,081

UNITED STATES PATENT OFFICE 2,266,081

MELTING POT DISCHARGE VALVE OPERATING MEANS

Jay T. Rogers, Indianapolis, Ind.

Application March 23, 1940, Serial No. 325,556

4 Claims. (Cl. 74—569)

In type casting machines now commonly in use, difficulty is experienced by reason of occasional breakage or distortion of parts of the mechanism provided for controlling flow of molten metal from the melting pot to the matrix.

The object of my present invention is to provide an improved valve-operating mechanism which may be readily adjusted and maintained in operative condition and free from liability of breakage under abnormal conditions.

The accompanying drawing is an elevation, in partial vertical section, of an embodiment of my invention.

In the drawing, 10 indicates a fragment of the melting pot adjacent its discharge nozzle 11 which is provided with an internal reciprocatory valve, reciprocated by means of a bell-crank lever 12 actuated through a link 13 by means of another bell-crank lever which, in turn, is oscillated by a rotary cam 15 rotated in time relation with the matrix carrier (not shown). Lever 12 is spring urged toward closed position of the nozzle valve.

Except for the details of construction of the bellcrank lever 14 the above-mentioned mechanism is standard and well known construction where, if the pot metal becomes unduly sluggish in the nozzle and adjacent parts, attempted movement of the control valve to open position in the nozzle results in breakage or distortion of the valve, or of the extension 30 of the lever 12.

To avoid this difficulty, I substitute for the second bell-crank lever mentioned above, the bell-crank lever 14, the depending arm 16 of which, instead of directly contacting cam 15, as in present constructions, is provided with a roller carrier 17 pivoted at 18 on arm 16 and provided with a roller 19 which engages cam 15.

Arm 16, opposite the free end of roller carrier 17, is perforated at 20 and through this perforation is projected a pin 21 the inner end of which contacts the free end of carrier 17. The outer end of pin 21 is threaded through a nut 22 carried by the free end of a spring 23 anchored at 24 on lever 14. The outer end of pin 21 is provided with a cross-slot 25 for the reception of a screw driver and threaded on the outer end of pin 21 is a check nut 26 abutting the outer end of nut 22. Between the inner end of nut 22 and arm 16 is a gauge washer 27 freely rotatable on pin 21. Embracing arm 16 and spring 23 at an intermediate point is a clip 28 provided with a set screw 29 which may be adjusted to bear more or less on spring 23 to adjust its resistance to flexing by cam 15. A lock nut 31 may be provided to hold screw 29 in adjusted position.

When the above-described lever 14 is equipped with parts as described above, the operator adjusts pin 21 in nut 22 to bring roller 19 into contact with cam 15 until lever 14 is swung sufficiently to shift the nozzle valve to open position, at the same time leaving washer 27 capable of turning easily but under a slight friction between nut 22 and arm 16 when set screw 29 is adjusted to give spring 23 the desired resistance. Washer 27 provides a convenient gauge by means of which the operator may determine the requisite adjustments.

When the parts have been so adjusted, rotation of cam 15, in its normal cycles, will intermittently exert pressure, through spring 23 upon the nozzle valve to drive said valve to opening position, but if, for any reason, there is an undue obstruction to this valve movement, spring 23 will yield to an abnormal extent thereby protecting the entire train of valve actuating parts against breaking or undue distortion.

The provision of the bell-crank lever 14 of the present application, with its associated parts, produces decided advantages in the operation of the casting machine, including economy, improved castings, and longer life of the vital working parts of the caster. The spring arrangement eliminates breakage of the nozzle valve and its operating lever extension 30, and the provision of the swinging arm 17 and roller 19 reduces wear and friction between the cam 15 and the lever arm 16. Likewise, the device of my invention materially reduces the necessity for adjustments, which adjustments are necessary with the rigid set screw mechanism heretofore used, whenever the cold machine is heated up again for use, or whenever a change is made in the caster speed. Thus, with such a rigid set screw adjustment, it is absolutely essential to adjust the setting of the valve actuating mechanism whenever the speed of the caster is changed, for the variation in centrifugal force, as the speed of the caster is increased, would result in breaking either the nozzle valve or its operating rod. When the caster is equipped with the transmission mechanism of my invention, however, the spring 23 will yield, under such circumstances, to prevent breakage of the parts, even though no adjustment is made.

I claim as my invention:

1. As an article of manufacture, a bell-crank lever having an abutment spring associated with one arm thereof, the free end of said spring being movable toward and from said arm, a member carried by said spring and movable therewith transversely of said arm and adapted to receive a propelling force and to transmit the same through said spring to swing said lever, and means for adjusting said member relative to the spring transversely thereof.

2. As an article of manufacture, a bell-crank lever having an abutment spring associated with one arm thereof, the free end of said spring being movable toward and from said arm, a member carried by said spring and movable therewith transversely of said arm and adapted to receive a propelling force and to transmit the same through said spring to swing said lever, means for adjusting said member relative to the spring transversely thereof, and a washer freely movable rotatively and axially on said member in position to be frictionally affected by the position of the spring relative to the lever.

3. As an article of manufacture, a lever pivoted intermediate its ends, a leaf spring having one arm secured to said lever adjacent its pivotal mounting and having its other end free and disposed adjacent an end of one arm of said lever, a member carried by said spring adjacent the free end thereof and movable therewith transversely of said lever arm and adapted to receive a propelling force and to transmit the same through said spring to swing said lever, and means for adjusting said member relative to the spring.

4. As an article of manufacture, a lever pivoted intermediate its ends, a leaf spring having one end secured to said lever adjacent its pivot point and having its other end disposed adjacent the end of one arm of said lever, a member carried by said spring adjacent the free end thereof and movable therewith transversely of said arm and adapted to receive a propelling force and to transmit the same through said spring to swing said lever, means for adjusting said member relative to the spring transversely thereof, and a washer freely movable rotatively and axially on said member in position to be frictionally affected by the position of the spring relative to the lever.

JAY T. ROGERS.